July 16, 1935. J. H. CLO 2,008,096
VALVE STEM
Filed July 3, 1930
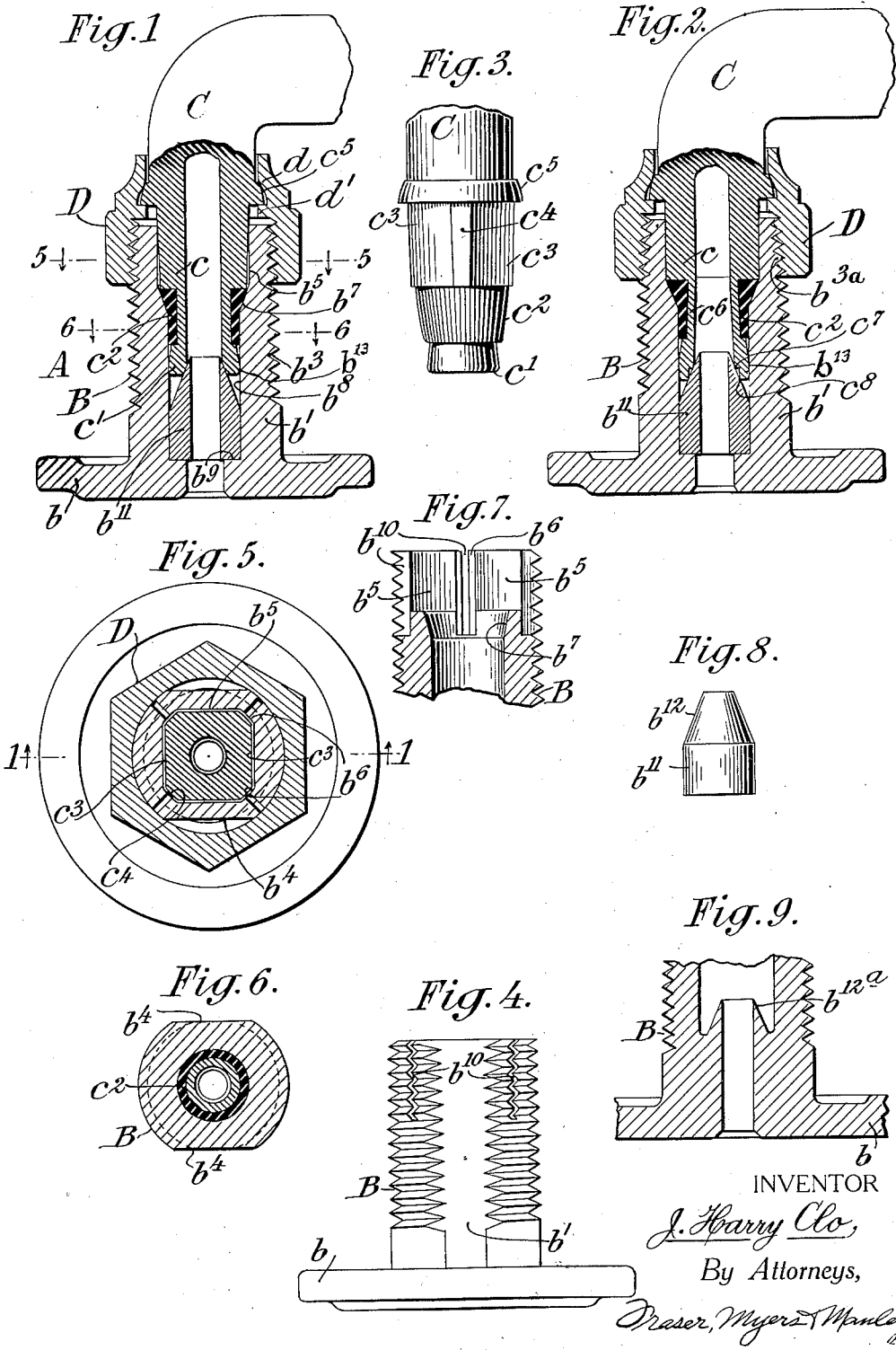

Patented July 16, 1935

2,008,096

UNITED STATES PATENT OFFICE 2,008,096

VALVE STEM

Jay Harry Clo, Baldwin, N. Y., assignor to A. Schrader's Son, Inc., Brooklyn, N. Y., a corporation of New York Application July 3, 1930, Serial No. 465,706

5 Claims. (Cl. 285—122)

The present invention relates to valve stems for tire valves or the like, and more particularly to a novel construction of two-piece valve stem and the manner of providing a leak-tight coupling joint between the parts of said two-piece valve stem.

Heretofore pneumatic inner tubes for tires have generally been provided with a one-piece or integral valve stems, said stems being of different lengths and shapes, depending upon the character of the wheel upon which the particular tire within which the inner tube was positioned, was to be mounted. In view of these variations in the lengths and shapes of valve stems, dealers and service stations were obliged to carry a large number of pneumatic tubes in stock to include these various types of stems.

It has been proposed to equip the inner tubes with a short valve stem part of standard dimensions and to supply to the service station or dealer, valve stem extension elements fitted with the valve insides, said extension elements being either straight or bent so that when assembled with the valve stem base in the tube, any desired type of valve stem could be provided. Although this proposal has not gone into extensive use, the valve stem parts at their coupling ends have been provided with various forms of coupling means for providing a leak-tight joint between the two valve stem parts, but for one reason or another said constructions have been found deficient or objectionable.

According to the present invention I provide a novel construction for the valve stem parts at their coupling ends whereby an efficient and rigid leak-tight joint between the valve stem parts is provided notwithstanding the considerable vibration to which such joints are subjected when the tire is upon a wheel in motion.

According to the present invention the valve stem parts are of such character that they may be quickly assembled without the aid of any special tools; one wherein the coupling joint therebetween provides a multiple seal against possible leakage, at least one of said seals being a metal to metal joint, which is preferably formed by metals having different degrees of hardness, one of which will flow when forced into contact with the seating face on the other, and wherein the assembly of the parts is such, that both axial and torsional rigidity between the parts is accomplished and in effect the equivalent of an integral valve construction is realized. The invention also embodies other advantages and features of novelty which will be apparent from the detailed description which follows, reference being had to the accompanying drawing, wherein:

Figure 1 is a longitudinal section of a two-piece valve stem, said section being taken along the plane of the line 1—1 of Fig. 5.

Fig. 2 is a view similar to Fig. 1 showing a modification of the invention.

Fig. 3 is an elevation of the lower end portion of the upper stem part.

Fig. 4 is an elevation of the stem base part or spud.

Fig. 5 is a section taken along the plane of the line 5—5 of Fig. 1.

Fig. 6 is a section taken along the plane of the line 6—6 of Fig. 1.

Fig. 7 is an axial section through the top of the spud.

Fig. 8 is an elevation of a detail of the invention.

Fig. 9 is a longitudinal section of a modified form of the stem base part or spud.

Referring to the drawing let A indicate a two-piece tire valve stem consisting of a stem base part or spud B, an upper valve stem part C and a coupling nut D for connecting the parts B and C together. The base part or spud B is provided with a conventional foot portion or flange $b$ adapted to engage against the inner face of a pneumatic tube, a tubular stem portion $b'$ having a bore extending therethrough and provided on its exterior surface with mutilated threads $b^3$ and opposite flat surfaces $b^4$ as is conventional on tire valve stems. The upper valve stem part C may have any desired shape and is adapted to be fitted at its outer end (not shown) with a conventional inflating valve or tire valve inside.

According to the present invention the parts B and C are of novel construction and when assembled into cooperative relation through the medium of coupling nut D, provide a simple, practicable and efficient valve stem, the joint between the parts of which is both leak-tight and rigid under all conditions of use. In a preferred embodiment of my invention, as shown in Fig. 1, the bore through the tubular stem portion $b'$ is of different diameters; at its top it has a square bore portion $b^5$ of large diameter, the corners of said bore being chamfered, as shown at $b^6$ in Fig. 5; below the square bore portion $b^5$ the bore tapers inwardly to provide a packing seating shoulder $b^7$, below which in turn the bore $b^8$ is of substantially uniform diameter, to a point slightly above the base flange $b$, whereat it is provided with a shoulder $b^9$. At its top the tubular portion $b'$ is provided with a plurality of axially extending slots $b^{10}$, which are cut to pass through the chamfered corners $b^6$ to provide in effect a plurality of clamping jaws. The slots $b^{10}$ preferably extend down into the tapered shoulder $b^7$, as shown in Fig. 7. Fitted within the bore $b^8$ and seating against the shoulder $b^9$ is a tubular plug $b^{11}$ which forms a leak-tight joint with the spud, the outer end of said plug being formed with a tapered surface $b^{12}$. The leak-tight joint between the plug and the spud may be made in any preferred manner, for example, the plug may be driven or force-fitted into the spud, it may be soldered therein, or it may be made integral with the spud, as shown at $b^{12a}$ in Fig. 9. The spud is thus provided with a reentrant nipple having a tapered seating face in spaced relation to the wall of the bore through the spud. It is also proposed to make the plug or nipple of harder metal than the upper stem part C, for a purpose which will be presently made apparent.

The valve stem part C, which may be of straight or angular form, is formed at its coupling end with a tubular extension $c$, the lower end $c'$ of which is of a diameter to freely pass into the bore $b^8$. The tubular extension $c$ above the end $c'$ is formed with an annular groove into which is disposed and preferably cured a rubber packing $c^2$ having a tapered outer wall. Above the packing the extension is formed with a square shank $c^3$, the corners of which are chamfered as shown at $c^4$, the square shank portion tapering slightly inwardly toward the lower end and adapted to fit within the square recess $b^5$. Above the square shank portion the stem part C is formed with an annular rib $c^5$ which is embraced by flanges $d$ and $d'$ formed on a bushing extension on the coupling nut D.

In the modification shown in Fig. 2 the upper end of the stem portion $b'$ is formed with an inwardly tapered thread $b^{3a}$ and the coupling nut D is provided with a complementally tapered, internal thread for cooperative engagement with the tapered thread $b^{3a}$. To facilitate the spreading of the lower end $c'$ of the tubular extension $c$ as it is forced over the tapered surface $b^{12}$ on the nipple, the wall of said extension supporting the packing $c^2$ may be made relatively thin, as shown at $c^6$. This construction will also augment the seating of the packing $c^2$ against the wall of the bore $b^8$. To still further facilitate the formation of a leak-tight seal between the lower end of the stem and the tapered surface within the spud, I may provide multiple seating contacts between said parts by forming the lower end of the entering member with spaced edges or ribs $c^7$, $c^8$ adapted to engage the tapered surface $b^{12}$ and be deformed thereagainst.

To couple the parts B and C together the tubular extension $c$ is inserted into the bore of the spud which is carried by the tire inner tube. The lower end of the extension $c'$ will enter the bore $b^8$ and abut against the tapered surface $b^{12}$ and the square shank $c^3$ will enter the square recess $b^5$. Upon threading the coupling nut D down over the threads $b^3$ axial pressure will be brought to bear upon the end of the extension, which will be forced to ride over the tapered surface $b^{12}$, and in view of the relative softness of the extension as compared with that of the nipple, the metal at the end of the extension will be caused to flow and provide a leak-tight seal with the surface of the plug. It is proposed to so proportion the parts that this flowing of the metal will continue until the outer surface of the end $c'$ will engage the wall of the bore $b^8$ and also form a seal therewith, as shown at $b^{13}$. In the course of the axial movement of the extension $c$ the lower portion of the packing $c^2$ will be forced into the bore $b^8$ to provide a seal with the wall of said bore, and the upper portion of said packing will be forced into leak-tight engagement with the tapered seat $b^7$. Upon continuing the tightening of the coupling nut D after airtight seals have been provided between the lower end of the extension and the plug, the lower end of the extension and the wall of the bore, and between the packing on the extension and the bore in the spud, a reactive force is set up between the threads on the spud and the threads on the nut, the horizontal component of which force acting radially inwardly upon the jaw-like ends of the stem portion $b'$ forces them into binding engagement with the square shank $c^3$. According to the modification shown in Fig. 2 the tapered threaded connection between the top of the spud and the coupling nut will bring about the clamping action of the jaw-like ends of the stem portion $b'$ with the square portion on the stem part C.

From the foregoing description it will be apparent that there is provided a triple seal against leakage of air through the joint between the valve stem parts. There is also realized both torsional and axial rigidity between the members at said joint because of the clutch-like gripping of the jaws on the spud with the square shank of the upper stem part and the locking engagement of the lower end of the extension $c'$ between the tapered nipple and the wall of the bore. The equivalent of an integral one-piece valve stem is thus accomplished with all the advantages of a two-piece stem.

In use, should the upper stem part C become damaged or should a leak develop at the joint between stem parts, or should it be desired to use the inner tube on a wheel requiring a different form of upper valve stem part, the upper stem part may be removed and replaced by another part, it being remembered that the nipple in the spud is formed of harder metal than the upper stem part, and therefore the nipple seating face will withstand the spreading action of the lower end of the extension without any detrimental effect.

While I have shown and described certain preferred embodiments of my invention I do not wish to be limited to the details of construction disclosed, since modifications thereof may be resorted to without departing from the spirit of the invention.

What I claim is:

1. A device of the class described, comprising a tubular entered member having spaced seats within its bore, one of which is a reentrant tapered seat, a tubular entering member having a part of softer material than the tapered seat adapted to engage said seat and be deformed into complemental shape therewith when forced thereagainst, a compressible packing on said entering member adapted to seat against the other seat on the entered member, and means for simultaneously forcing the part of softer material against the tapered seat and the packing against its complemental seat as the members are being coupled together.

2. A device of the class described, comprising a tubular entered member, a tubular entering member, longitudinally spaced apart seating surfaces on each of said members adapted to cooperate with one another to provide a multiple leak-tight seal between the members, at least one of said seals being provided by a metal to metal joint, and means for coupling the members together to effect such seals.

3. A device of the class described, comprising a tubular entered member, a tubular entering member, longitudinally spaced apart seating surfaces on each of said members adapted to cooperate with one another to provide a multiple leak-tight seal between the members, at least one of said seals being provided by a metal to metal joint whereat a flowing of the metal at one of the seating faces takes place as the members are forced into coupling engagement.

4. A device of the class described, comprising a tubular entered member, a tubular entering member, means for providing a leak-tight seal therebetween, and cooperating means on said members adapted to hold them in coupled relation against relative axial, radial and rotational movement, said last named means comprising complemental non-circular faces on the members, a coupling nut swivelly carried by one of the members, screw threads on the other member for engagement by the coupling nut, said threaded portion being longitudinally slotted to provide jaw-like portions adapted to be moved inwardly when the coupling nut is threaded home thereon.

5. A device of the class described, comprising a tubular entered member, a tubular entering member, means for providing a leak-tight seal therebetween, the entered member at its top having a bore of polygonal form longitudinally slotted at the angles of the bore to provide jaws, and the part of the entering member engaging within the top portion of the entered member being of complemental polygonal form, and means for coupling said members together, said coupling means also functioning to move the jaws into clamping engagement with the entering member.

J. HARRY CLO.